United States Patent
Wang et al.

(10) Patent No.: US 12,429,415 B2
(45) Date of Patent: Sep. 30, 2025

(54) MICROSCOPIC AND MACROSCOPIC EVALUATION METHOD FOR DUAL-EFFECT HYDRATE INHIBITOR

(71) Applicant: CHINA UNIVERSITY OF PETROLEUM (EAST CHINA), Qingdao (CN)

(72) Inventors: Zhiyuan Wang, Qingdao (CN); Jihao Pei, Qingdao (CN); Baojiang Sun, Qingdao (CN); Zhengfeng Shan, Qingdao (CN); Longqiao Chen, Qingdao (CN); Jianbo Zhang, Qingdao (CN); Shikun Tong, Qingdao (CN)

(73) Assignee: CHINA UNIVERSITY OF PETROLEUM (EAST CHINA), Qingdao (CN)

(*) Notice: Subject to any disclaimer, the term of this patent is extended or adjusted under 35 U.S.C. 154(b) by 0 days.

(21) Appl. No.: 18/260,254

(22) PCT Filed: Mar. 10, 2023

(86) PCT No.: PCT/CN2023/080736
§ 371 (c)(1),
(2) Date: Jul. 3, 2023

(87) PCT Pub. No.: WO2023/169553
PCT Pub. Date: Sep. 14, 2023

(65) Prior Publication Data
US 2024/0385103 A1    Nov. 21, 2024

(30) Foreign Application Priority Data
Mar. 11, 2022   (CN) .......................... 202210235611.9

(51) Int. Cl.
*G01N 19/04*     (2006.01)
*E21B 37/06*     (2006.01)
(Continued)

(52) U.S. Cl.
CPC .............. *G01N 19/04* (2013.01); *E21B 37/06* (2013.01)

(58) Field of Classification Search
CPC ........ G01N 19/04; G01N 15/00; G01N 11/00; G01N 31/00; G01N 13/02; G01N 33/26;
(Continued)

(56) References Cited

U.S. PATENT DOCUMENTS

| | | | |
|---|---|---|---|
| 11,041,819 B1 | 6/2021 | Li et al. | |
| 2007/0276169 A1 | 11/2007 | Tohidi et al. | |

FOREIGN PATENT DOCUMENTS

| | | | |
|---|---|---|---|
| CN | 101692077 A | | 4/2010 |
| CN | 105301205 A | * | 2/2016 |

(Continued)

OTHER PUBLICATIONS

Fan Shuanshi, et al., Present situation and prospect of performance evaluation methods for kinetic hydrate inhibitors (KHIs), Natural Gas Industry, 2018, pp. 103-113, vol. 38 No. 9.

*Primary Examiner* — Brandi N Hopkins
(74) *Attorney, Agent, or Firm* — Bayramoglu Law Offices LLC

(57) ABSTRACT

A microscopic and macroscopic evaluation method for a dual-effect hydrate inhibitor is provided. The method is applicable to the performance evaluation of traditional thermodynamic inhibitors and kinetic inhibitors. The present invention comprehensively evaluates the dual-effect hydrate inhibitor microscopically and macroscopically through a microscopic evaluation device and a macroscopic evaluation device, thereby more intuitively and efficiently screening out the dual-effect inhibitor with excellent performance. The present invention explains the action mechanism of the dual-effect inhibitor microscopically, accurately evaluate the effects of the inhibitor in two aspects of particle aggregation and particle adhesion, and provide a theoretical basis for (Continued)

screening the dual-effect inhibitor. Moreover, the present invention can verify the screened inhibitor macroscopically by using a flow evaluation device close to a field working condition to obtain the action effects of the dual-effect inhibitor under different production parameters, so that the comprehensive and multi-angle performance evaluation of the dual-effect inhibitor is achieved.

2 Claims, 3 Drawing Sheets

(51) Int. Cl.
*G01N 3/08* (2006.01)
*G01N 33/00* (2006.01)

(58) Field of Classification Search
CPC ...... G01N 24/081; G01N 21/65; G01N 27/00; G01N 11/08; G01N 33/225; G01N 21/3581; G01L 5/00; C09K 8/524; F17D 1/16; C08K 5/3432; E21B 37/06; G06F 30/20; G01M 3/02; C10L 3/107

See application file for complete search history.

(56) References Cited

FOREIGN PATENT DOCUMENTS

| CN | 108535180 | A | | 9/2018 | |
|----|-----------|---|---|--------|--|
| CN | 105628551 | B | * | 12/2018 | ............... G01N 1/28 |
| CN | 110992806 | A | | 4/2020 | |
| CN | 111022925 | A | | 4/2020 | |
| CN | 210604623 | A | | 5/2020 | |
| CN | 111239361 | A | * | 6/2020 | ........... G01N 33/222 |
| CN | 112691610 | A | | 4/2021 | |
| CN | 112782074 | A | | 5/2021 | |
| CN | 113686497 | A | | 11/2021 | |
| CN | 114609337 | A | | 6/2022 | |
| WO | 2017089846 | A1 | | 6/2017 | |

* cited by examiner

MICROSCOPIC AND MACROSCOPIC EVALUATION METHOD FOR DUAL-EFFECT HYDRATE INHIBITOR

CROSS REFERENCE TO THE RELATED APPLICATIONS

This application is the national phase entry of International Application No. PCT/CN2023/080736, filed on Mar. 10, 2023, which is based upon and claims priority to Chinese Patent Application No. 202210235611.9, filed on Mar. 11, 2022, the entire contents of which are incorporated herein by reference.

TECHNICAL FIELD

The present invention relates to a microscopic and macroscopic evaluation method for a dual-effect hydrate inhibitor, and belongs to the technical field of performance evaluation of hydrate inhibitors.

BACKGROUND

In the process of deepwater oil and gas drilling and production and hydrate development, the temperature near a mud line is low, the pressure is high, and gas and water produced in reservoirs are easy to generate natural gas hydrate in the environment, and the natural gas hydrate is deposited and adheres to a pipe wall, which reduces the flowing area of a wellbore and blocks even a production string, seriously threatening the life safety of workers. At present, the commonly used hydrate management policy is to add excessive thermodynamic inhibitor to completely stop the generation of hydrate in the wellbore, however, the inhibitor has the disadvantages of large amount, high cost, and unfriendly environment. The dynamic management policy of hydrate is a new idea of hydrate control proposed in recent years. This technology allows the formation of hydrate, but keeps the formed hydrate maintains fluidity and flows along the pipeline, thus avoiding the aggregation and the deposition of the formed hydrate particles in the pipeline. At present, a hydrate inhibitor is also developing towards a dual-effect inhibitor that "allows hydrate formation, prevents particle aggregation, and inhibits particle adhesion on the pipe wall". However, the existing dual-effect inhibitor evaluation means are single, consequently, the performance of a dual-effect inhibitor cannot be evaluated efficiently and comprehensively.

Currently, evaluation means aiming at the dual-effect hydrate inhibitor is mainly divided into a macroscopic aspect and a microscopic aspect. Macroscopically, equipment such as a flow loop, a high-pressure stirring kettle, and a swing kettle is generally used to evaluate the performance of the hydrate inhibitor, and the performance of the inhibitor is evaluated by monitoring temperature and pressure change, torque change, and small ball movement time in a system, however, in the flow loop, a circulating pump can continuously damage formed hydrate aggregates, and a static kettle cannot achieve the performance evaluation of the dual-effect inhibitor in a flow state; whereas micro-evaluation generally uses a micro-mechanical force (MMF) experimental device to measure the adhesion force between hydrate particles, however, the method is generally performed under normal pressure and cannot accurately represent the inhibition effect in the actual production.

SUMMARY

In order to solve the defects in the prior art, the present invention provides a microscopic and macroscopic evaluation method for a dual-effect hydrate inhibitor, the method is also applicable to the performance evaluation of traditional thermodynamic inhibitors and kinetic inhibitors, and the method is used to comprehensively evaluate the dual-effect inhibitor microscopically and macroscopically, so that the dual-effect inhibitor with excellent performance can be screened out more intuitively and efficiently.

The present invention adopts the following technical solutions.

A microscopic and macroscopic evaluation method for a dual-effect hydrate inhibitor, including: comprehensively evaluating the dual-effect hydrate inhibitor microscopically and macroscopically through a microscopic evaluation device and a macroscopic evaluation device, and screening out the dual-effect inhibitor with excellent performance.

Firstly, the adhesion force between the hydrate particles and the hydrate particles formed by an inhibitor solution to be tested, the liquid drops or the surface of carbon steel is measured by using a microscopic evaluation device, and the smaller measurement value indicates the better performance of the inhibitor; and then, a macroscopic experiment is performed by using a macroscopic evaluation device to obtain the blockage time of the pipeline under the condition of injecting different inhibitor solutions, and the longer time indicates the better performance of the inhibitor, and thus, the microscopic experiment is verified in a macroscopic flow state.

Inhibitor solutions include a single agent or a composite agent, such as thermodynamic inhibitor: ethylene glycol, kinetic inhibitors: PVP, PVCap, and polyIPMA, anti-agglomerants: quaternary ammonium salt, and the composite agent is the compounding of the single agents.

Preferably, the microscopic evaluation device includes an MMF measurement module, a constant-temperature water bath module, a gas injection module A, and a data collection module A, wherein the MMF measurement module includes a high-pressure cavity, a three-dimensional tilt-shift connecting rod, and a three-dimensional moving platform, the three-dimensional moving platform is arranged in the high-pressure cavity and is connected to the three-dimensional tilt-shift connecting rod, and a position of the three-dimensional moving platform is adjusted through the three-dimensional tilt-shift connecting rod; the high-pressure cavity includes 4 sealing rings, the 4 sealing rings are distributed at a high-pressure cavity cover and a connection between the three-dimensional tilt-shift connecting rod and the high-pressure cavity, the pressure resistance can be 25 MPa, and a high-pressure hydrate particle MMF experiment can be performed in the high-pressure cavity through glass fibers;

two glass fibers are arranged in the high-pressure cavity, one end of one glass fiber is fixed on an inner wall of the high-pressure cavity, the other end of one glass fiber is configured to place ice particles, one end of the other glass fiber is fixed on the three-dimensional moving platform, and the other end of the other glass fiber is configured to place ice particles/liquid drops/carbon steel; the ice particles can generate hydrate particles through an ice particle induction method, and the hydrate particles can be used to evaluate the adhesion force between the hydrate particles and the hydrate particles, between the hydrate particles and the liquid drops, or between the hydrate particles and the surface of carbon steel;

the constant-temperature water bath module includes a circulating water bath system, and the high-pressure cavity is arranged in the constant-temperature environment to reach a temperature required by an experiment;

in order to prolong the service life of a circulating pump arranged in the water bath, the circulating water bath system and a high-pressure sealed cabin are preferably arranged on the same horizontal line, the circulating pump is connected to the sealed cavity through a hose which is insulated through a thermal insulation material;

the gas injection module A includes a high-pressure gas source A, a pipeline of the high-pressure gas source A is connected to the high-pressure cavity through a pressure reducing valve A and a gas inlet valve A, gas is added into the high-pressure cavity by the high-pressure gas source A through a cooling device, hydrate particles are produced by using an ice particle induction method, a pressure gauge A is arranged on the pipeline of the high-pressure gas source A, and a blow-off valve A is further arranged on the high-pressure cavity; and the data collection module A includes a microscopic imaging system, a data collection system A, a temperature sensor A, and a pressure sensor A, wherein a visible window is installed on the high-pressure cavity, the microscopic imaging system is aligned with the visible window to observe a microscopic morphology in the high-pressure cavity in real time, the temperature sensor A and the pressure sensor A are both connected to the high-pressure cavity and configured to measure pressure and temperature in the high-pressure cavity in real time, the microscopic imaging system, the temperature sensor A, and the pressure sensor A are all in signal connection to the data collection system A, the temperature and pressure changes in the experimental process are collected and monitored in real time through the data collection module A and recorded, the microscopic morphology of hydrate particles is observed in real time through the microscopic imaging system, and the micro-mechanical force among the hydrate particles is tested through controlling the three-dimensional moving platform.

Preferably, the high-pressure gas source A is a hydrocarbon gas, such as methane gas, propane gas, or a mixture of both, and cannot be an acid gas such as carbon dioxide.

Preferably, the microscopic evaluation system of the dual-effect hydrate inhibitor is used to perform experiments, the experimental process includes an experiment preparation stage, hydrate particles induction stage, hydrate shells annealing stage and a pull-off test stage, and the experimental steps of the microscopic evaluation device include:

1) experiment preparation stage:
cooling the constant-temperature environment to −7 to −10° C. by using the circulating water bath system, measuring an elasticity coefficient of glass fibers required by the experiment, taking two glass fibers, placing required test liquid drops at a tip of one glass fiber, preparing ice particles by liquid nitrogen, and placing ice particles, carbon steel, or liquid drops at a tip of the other glass fiber as required;

2) hydrate particles induction stage:
rapidly putting the prepared ice particles into the high-pressure cavity, opening the blow-off valve A, circulating and ventilating the high-pressure cavity through the high-pressure gas source A to ensure that gas in the high-pressure cavity is pure, closing the blow-off valve A, pressurizing to the pressure required by the experiment, inducing the generation of hydrate particles through ice particles (the temperature and the pressure required by the generation of the hydrate must reach phase equilibrium conditions, the ice particle induction method is a mature conventional technology and is not described here), and marking the moment as an initial moment of the experiment, wherein the hydrate particles are formed by the inhibitor solution;

3) hydrate particles annealing stage:
raising the temperature of the constant-temperature environment to the experimental temperature and keeping stable for 2 h, namely annealing for 2 h, so as to ensure that shells of the hydrate particles are hard enough;

it should be noted that the experimental temperature in the present invention needs to be determined according to the subcooling degree, where the subcooling degree=the phase equilibrium temperature of the hydrate formation−the ambient temperature, and the phase equilibrium temperature depends on the pressure condition. Therefore, the subcooling degree required for the test is determined first, then the test pressure (phase equilibrium temperature) is determined, and finally the experimental temperature is determined. Under ideal conditions, the experimental temperature is about 1° C. to the room temperature, however, the highest pressure bearing of the equipment is 25 MPa, the phase equilibrium temperature cannot be raised infinitely, and if the high subcooling condition is needed, the experimental temperature can be reduced as far as possible and can be 1-3° C.

4) adhesion force testing stage:
adjusting the three-dimensional moving platform through the three-dimensional tilt-shift connecting rod to enable two measuring objects to be kept on the same horizontal line, then controlling the three-dimensional moving platform to enable the tip of the glass fiber on the three-dimensional moving platform to slowly approach the tip of the other glass fiber at a constant speed, namely enabling a moving end to gradually approach a fixed end, enabling the moving end to continuously move to press the fixed end and displace 0.3 mm after the two measuring objects are contacted, keeping the two measuring objects in contact for 10 s, and then slowly pulling apart at a constant speed until the two measuring objects are completely separated;

the two measuring objects are hydrate particles generated by the ice particle induction method in the step 2) and hydrate particles (formed by ice particles)/carbon steel/liquid drops mentioned in the step 1), and the centers of the measuring objects are kept on the same horizontal line during testing;

photographing an image when two measuring objects are separated by using the microscopic imaging system, measuring the displacement of the fixed end in the photographed image, and converting the displacement into an actual displacement of the fixed end;

calculating a micro-mechanical force between the two measuring objects by using Hooke's law, and repeating the experiment 40 times;

5) slowly releasing pressure through the blow-off valve A after the experiment is finished.

Preferably, in the step 1), the process of measuring an elasticity coefficient of glass fibers is preferably as follows:
placing a support on an electronic balance, pressing a top end of the support by using the glass fibers, recording the displacement of a bottom end of the glass fibers and the reading of the balance, and calculating the elastic coefficient according to Hooke's law;

Preferably, in the step 4), after the displacement of the fixed end in the photographed image is measured, the displacement on the image can be converted into the actual displacement by using a calibration paper, or the actual displacement is obtained by using ImageJ software for processing.

Preferably, in the step 4), when the micro-mechanical force between the two objects is calculated by using Hooke's law, in order to eliminate the influence of the particle size on the measurement, the particle size needs to be normalized, and then a correction value of the micro-mechanical force between the two objects can be obtained. Specifically, the process of calculating a micro-mechanical force between the two measuring objects is as follows:

$$F = k \cdot \delta \quad (1)$$

$$R^* = \frac{2R_1 R_2}{R_1 + R_2} \quad (2)$$

$$F^* = \frac{F}{R^*} \quad (3)$$

wherein F is a measurement value of the micro-mechanical force between two measuring objects, and the unit is N; F* is a correction value of the micro-mechanical force between two measuring objects, and the unit is N; k is the elastic coefficient of the glass fiber, and the unit is N/m; δ is the actual displacement of the fixed end, and the unit is m; $R_1$ and $R_2$ are curvature radii of two measuring objects, the unit is m; and R* is a harmonic mean radius, and the unit is m.

The microscopic evaluation method for the dual-effect hydrate inhibitor is mainly embodied in the adhesion force between hydrate particles and hydrate particles, between hydrate particles and liquid drops and between hydrate particles and the surface of carbon steel in a high-pressure system. Different experimental materials are placed at the tip of the glass fiber according to test requirements, the adhesion force between two objects is measured, and the smaller adhesion force value represents the poorer aggregation capacities among hydrate particles and among hydrate particles-liquid drops-hydrate particles, which indicates the poorer adhesion capacity of the hydrate particles on the pipe wall, so that the better effects of preventing particle aggregation and inhibiting particle adhesion of the dual-effect inhibitor are proved.

Preferably, the macroscopic evaluation device includes an experiment module, a water injection module, a gas injection module B, and a data collection module B, wherein the experiment module includes a constant-temperature water bath and a fully transparent PVC pipe positioned in the constant-temperature water bath, the fully transparent PVC pipe has an inner diameter of preferably 12 mm, a total length of 1.0 m, and the pressure resistance of 10 MPa, the generation, deposition and blockage processes of hydrates all occur in the fully transparent PVC pipe, the constant-temperature water bath is connected to a refrigeration cycle machine through a pipeline and configured to keep a temperature of the constant-temperature water bath constant, both ends of the fully transparent PVC pipe are provided with temperature sensors B and pressure sensors B, and the data collection module is configured to collect and monitor temperature and pressure changes in the experiment process in real time;

the gas injection module B includes a high-pressure gas source B, a pipeline of the high-pressure gas source B is connected to an inlet of the fully transparent PVC pipe through a pressure reducing valve B, a gas flowmeter, a gas inlet valve B and a cooling pipe coil, a pressure gauge B is arranged on the pipeline of the high-pressure gas source B, an outlet of the fully transparent PVC pipe is also connected to a pipeline outlet valve, the pipeline outlet valve is in communication with the atmosphere, and the experimental pressure is controlled by controlling the outlet valve; high-pressure gas enters from the pipeline inlet through the gas flowmeter with a test solution, wherein the high-pressure gas needs to be cooled by a coil pipe placed in a cold water bath before entering an experimental pipeline so as to reach the experimental temperature;

the water injection module includes a container for containing a test solution, the test solution enters from the inlet of the fully transparent PVC pipe through a liquid plunger pump and a water inlet valve, a blow-off valve B is arranged on a pipeline of the test solution, the liquid plunger pump can control the water injection rate by adjusting the pump frequency, the test solution is an inhibitor solution, which type of inhibitor needs to be tested, and the test solution with the required concentration, such as an ethylene glycol solution, needs to be prepared according to the test requirement;

the data collection module B includes a data collection system B and a DV camera, the DV camera is configured to photograph a blockage process in the fully transparent PVC pipe in real time, namely the hydrate migration, deposition and blockage states, the gas flowmeter and the temperature sensors B and the pressure sensors B at the two ends of the fully transparent PVC pipe are connected to the data collection system B, and the temperature sensors B and the pressure sensors B monitor the temperature and pressure changes of an inlet and an outlet in real time and transmit the temperature and pressure changes into the data collection system B together with the gas flowmeter.

Preferably, a pipeline at the outlet of the full transparent PVC pipe is bent and placed in a 100° C. thermal insulation barrel, and a pipeline at the outlet of the pipeline has a serious throttling effect due to the small pipe diameter, consequently, hydrate is easily generated at the outlet at a low temperature, and a non-experimental section is blocked. Therefore, the outlet of the pipeline is heated by using the thermal insulation barrel to prevent the outlet from being blocked.

Preferably, the experimental steps of the macroscopic evaluation device include:

S1: experimental preparation stage:

adding an experimental gas (such as hydrocarbon gas) into the fully transparent PVC pipe, discharging residual gas and liquid in the pipe to ensure that the gas in the pipe is pure, reducing the temperature of the constant-temperature water bath to the experimental temperature, reducing the temperature of the test solution to the experimental temperature (the temperature of the prepared solution can be reduced to the experimental temperature in a refrigerator, and then the temperature is kept low by ice cakes in the experimental process), and mixing the test solution well by a magnetic stirrer;

S2: starting the data collection system B to collect data, opening the gas inlet valve to enable the experimental gas to enter the experimental pipeline, controlling the pipeline outlet valve to change the pressure of the fully transparent PVC pipe, and keeping the opening of the pipeline outlet valve stable when the pressure in the fully transparent PVC pipe reaches the experimental pressure (the experimental pressure safety interval is 0-10 MPa according to the safety requirement of equipment);

S3: recording an initial amount of the test solution, starting the liquid plunger pump, injecting the test solution into the fully transparent PVC pipe at a constant rate (the rate depends on the required pipe flow pattern distribution and the gas injection speed), and recording the time for starting injection as a starting moment of the experiment;

S4: collecting data in real time through the temperature sensors B, the pressure sensors B, and the gas flowmeter, and photographing the process of hydrate generation, deposition and blockage in the fully transparent PVC pipe in real time through the DV camera;

S5: in the experiment, keeping the pressure of the inlet of the pipeline stable by controlling the pressure reducing valve B, when the occurrence of hydrate blockage, and the pressure of the outlet of the pipeline and the gas flow are observed to be reduced to 0 (namely, when the values of the pressure sensors B at the outlet end of the fully transparent PVC pipe and the gas flowmeter are 0), which means that the experiment is finished, closing the liquid plunger pump, recording the amount of the residual test solution and the time that is used as the termination time of the experiment, slowly opening the pipeline outlet valve to reduce the pressure in the pipeline, promoting the hydrate decomposition, weighing the weight of hydrate decomposition water, and use the weight to reversely calculate the amount of deposited hydrate.

After the pressure in the pipe is reduced, the hydrate can be completely decomposed, the gas inlet valve B is opened to continuously add gas to the pipe, and a collector is placed at the outlet of the pipe to collect the hydrate decomposition water in the pipe, so that the weight of the hydrate decomposition water is obtained. The amount of hydrates can be reversely deduced from the type of the generated hydrates and the amount of decomposition water, for example, the ideal molecular formula of the type I hydrate is $8M \cdot 46H_2O$, so that 5.75 water molecules are required to generate one hydrate molecule; the molecular formula of the type II hydrate is $24M \cdot 136H_2O$, 5.67 water molecules are required to generate one hydrate, and therefore, the generated hydrate amount can be reversely deduced from the amount of decomposition water.

The macroscopic evaluation method for the dual-effect hydrate inhibitor is mainly embodied in three aspects of experimental pipeline blockage time, differential pressure between the pipeline inlet and outlet, and temperature drop amplitude caused by throttling effect after the pipeline is completely blocked. By comparing a time period required from the beginning of the experiment to the complete blockage of the pipeline and a time period required for the differential pressure between the inlet and outlet of the pipeline to reach the maximum, the effects of dual-effect inhibitor on "preventing the aggregation of hydrate particles" and "inhibiting the adhesion of hydrate particles on the pipe wall" can be compared, and a longer time period indicates a better effect of the type of inhibitor; or the effects of dual-effect inhibitor are compared by comparing the magnitude of the temperature drop at the outlet when the pipeline is completely blocked, a smaller temperature drop amplitude represents more loose formed hydrate aggregate, which indicates a better inhibition effect.

For a part that is not described in detail in the present invention, reference is made to the prior art.

The beneficial effects of the present invention are as follows.

1. For the microscopic and macroscopic evaluation method for a dual-effect hydrate inhibitor, microscopically, the evaluation method solves the problem that the conventional MMF measurement cannot be performed under the high-pressure condition, and provides a method for evaluating the performance of the dual-effect hydrate inhibitor by measuring the adhesion force between hydrate particles and hydrate particles, between hydrate particles and liquid drops and between hydrate particles and the pipe wall; and macroscopically, the evaluation method solves the problem that the hydrate aggregate form cannot be monitored in real time due to damage of a circulating pump to the hydrate aggregate in the conventional flow loop, and innovatively uses the differential pressure and throttling temperature drop curve to represent the influence of an inhibitor on hydrate deposition and blockage.

2. The present invention can explain the action mechanism of the dual-effect inhibitor microscopically, accurately evaluate the effects of the inhibitor in two aspects of particle aggregation and particle adhesion, and provide a theoretical basis for screening the dual-effect inhibitor. Moreover, the present invention can verify the screened inhibitor macroscopically by using a flow evaluation device close to a field working condition to obtain the action effects of the dual-effect inhibitor under different production parameters, so that the comprehensive and multi-angle performance evaluation of the dual-effect inhibitor is achieved.

Figure 1:
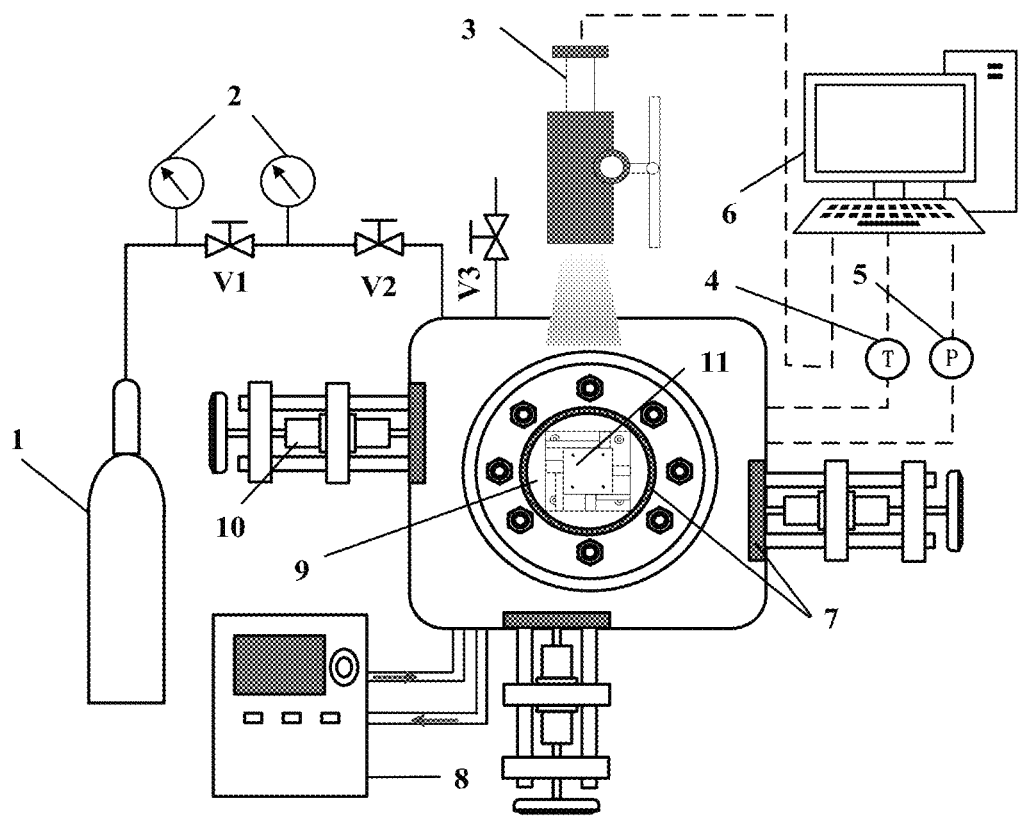
FIG. 1 is a schematic diagram of a structure of a microscopic evaluation device according to the present invention.

In the drawings: 1—high-pressure gas source A, 2—pressure gauge A, 3—microscopic imaging system, 4—temperature sensor A, 5—pressure sensor A, 6—data collection system A, 7—sealing ring, 8—circulating water bath system, 9—high-pressure cavity, 10—three-dimensional tilt-shift connecting rod, 11—three-dimensional moving platform, 12—glass fiber, 13—fixing support, 14—constant-temperature water bath, 15—fully transparent PVC pipe, 16—refrigeration cycle machine, 17—temperature sensor B, 18—pressure sensor B, 19—high-pressure gas source B, 20—gas flowmeter, 21—cooling pipe coil, 22—pressure gauge B, 23—test solution, 24—liquid plunger pump, 25—data collection system B, 26—DV camera, 27—magnetic stirrer, V1—pressure reducing valve A, V2—gas inlet valve A, V3—blow-off valve A, V4—pressure reducing valve B, V5—gas inlet valve B, V6—pipeline outlet valve, V7—water inlet valve, and V8—blow-off valve B.

DETAILED DESCRIPTION OF THE EMBODIMENTS

In order to make those skilled in the art better understand the technical solutions in the specification, the technical solutions in the embodiments of the present invention are clearly and completely described below with reference to the drawings in the implementation of the present specification, but are not limited thereto. For a part that is not described in detail in the present invention, reference is made to the conventional technology in the art.

Embodiment 1

A microscopic and macroscopic evaluation method for a dual-effect hydrate inhibitor, as shown in FIGS. 1 to 5, including: comprehensively evaluating the dual-effect hydrate inhibitor microscopically and macroscopically through a microscopic evaluation device and a macroscopic evaluation device, and screening out the dual-effect inhibitor with excellent performance.

Firstly, the adhesion force between the hydrate particles and the hydrate particles formed by an inhibitor solution to be tested, the liquid drops or the surface of carbon steel is measured by using a microscopic evaluation device, and the smaller measurement value indicates the better performance of the inhibitor; and then, a macroscopic experiment is performed by using a macroscopic evaluation device to obtain the blockage time of the pipeline under the condition of injecting different inhibitor solutions, and the larger time value indicates the better performance of the inhibitor, and thus, the microscopic experiment is verified in a macroscopic flow state.

Embodiment 2

A microscopic and macroscopic evaluation method for a dual-effect hydrate inhibitor, as described in Embodiment 1, the difference is that, as shown in FIG. 1, the microscopic evaluation device includes an MMF measurement module, a constant-temperature water bath module, a gas injection module A, and a data collection module A, wherein the MMF measurement module includes a high-pressure cavity 9, a three-dimensional tilt-shift connecting rod 10, and a three-dimensional moving platform 11, the three-dimensional moving platform 11 is arranged in the high-pressure cavity 9 and is connected to the three-dimensional tilt-shift connecting rod 10, and a position of the three-dimensional moving platform 11 is adjusted through the three-dimensional tilt-shift connecting rod 10; the high-pressure cavity 9 includes 4 sealing rings 7, the 4 sealing rings are distributed at a high-pressure cavity cover and a connection between the three-dimensional tilt-shift connecting rod and the high-pressure cavity, the pressure resistance can be 25 MPa, and a high-pressure hydrate particle MMF experiment can be performed in the high-pressure cavity through glass fibers;

two glass fibers 12 are arranged in the high-pressure cavity 9, one end of one glass fiber is fixed on an inner wall of the high-pressure cavity 9 through the fixing support 13, the other end of one glass fiber is configured to place ice particles, one end of the other glass fiber is fixed on the three-dimensional moving platform 11 through the fixing support 13, and the other end of the other glass fiber is configured to place ice particles/liquid drops/carbon steel; the ice particles can be prepared into hydrate particles through an ice particle induction method, so that the adhesion force between the hydrate particles and the hydrate particles, between the hydrate particles and the liquid drops, or between the hydrate particles and the surface of carbon steel is evaluated;

the constant-temperature water bath module includes a circulating water bath system 8, and the high-pressure cavity 9 is arranged in the constant-temperature environment to reach a temperature required by an experiment; in order to prolong the service life of a circulating pump arranged in the water bath, the circulating water bath system and a high-pressure sealed cabin are preferably arranged on the same horizontal line, the circulating pump is connected to the sealed cavity through a hose, and the outside of the hose is insulated through a thermal insulation material;

the gas injection module A includes a high-pressure gas source A 1, a pipeline of the high-pressure gas source A 1 is connected to the high-pressure cavity 9 through a pressure reducing valve A V1 and a gas inlet valve A V2, gas is added into the high-pressure cavity by the high-pressure gas source A 1 through a cooling device, hydrate particles are produced by using an ice particle induction method, a pressure gauge A 2 is arranged on the pipeline of the high-pressure gas source A 1, and a blow-off valve A V3 is further arranged on the high-pressure cavity 9; and the data collection module A includes a microscopic imaging system 3, a data collection system A 6, a temperature sensor A 4, and a pressure sensor A 5, wherein a visible window is installed on the high-pressure cavity 9, the microscopic imaging system 3 is aligned with the visible window to observe a microscopic morphology in the high-pressure cavity in real time, the temperature sensor A 4 and the pressure sensor A 5 are both connected to the high-pressure cavity 9 and configured to measure pressure and temperature in the high-pressure cavity in real time, the microscopic imaging system 3, the temperature sensor A 4, and the pressure sensor A 5 are all in signal connection to the data collection system A 6, the temperature and pressure changes in the experimental process are collected and monitored in real time through the data collection module A and recorded, the microscopic morphology of hydrate particles is observed in real time through the microscopic imaging system, and the micro-mechanical force among the hydrate particles is tested through controlling the three-dimensional moving platform.

The high-pressure gas source A 1 is a hydrocarbon gas.

Embodiment 3

Figure 2:
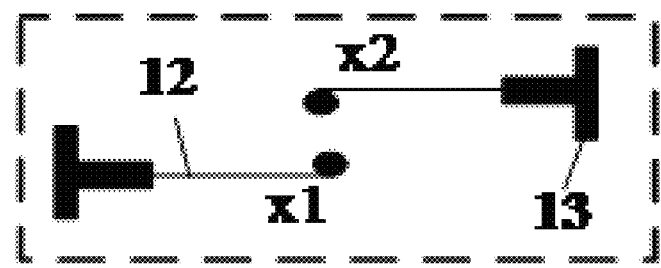
FIG. 2 is a schematic diagram of a positional relationship of two glass fibers in FIG. 1.

A microscopic and macroscopic evaluation method for a dual-effect hydrate inhibitor, as described in Embodiment 2, the difference is that the performance microscopic evaluation system of the dual-effect hydrate inhibitor is used to perform experiments, the experimental process includes an experiment preparation stage, hydrate particles induction stage, hydrate shells annealing stage and a pull-off test stage, and the experimental steps of the microscopic evaluation device include:

1) experiment preparation stage:

cooling the constant-temperature environment to −7° C. by using the circulating water bath system 8 (liquid in the circulating water bath system is antifreeze liquid, the lowest temperature can reach −50° C., and the temperature is reduced to keep ice particles not to melt), taking two glass fibers required by the experiment, measuring an elasticity coefficient of glass fibers, as shown in FIG. 2, placing required test liquid drops at a tip x1 of one glass fiber 12, preparing ice particles by liquid nitrogen, and placing ice particles/carbon steel/liquid drops (both the ice particles and the liquid drops are generated by inhibitor solution) at a tip x2 of the other glass fiber as required by the experiment;

2) hydrate particles induction stage:

rapidly putting the prepared ice particles into the high-pressure cavity, meanwhile, placing the ice particles and glass fibers into the high-pressure cavity together, so that one glass fiber is fixed on a three-dimensional moving platform 11 through a fixing support 13 and serves as a moving end, and the other glass fiber is fixed on the inner wall surface of the high-pressure cavity through the fixing support 13 and serves as a fixed end; opening the blow-off valve A V3, circulating and ventilating the high-pressure cavity 9 for more than 5 min through the high-pressure gas source A 1 to ensure that gas in the high-pressure cavity 9 is pure, closing the blow-off valve A V3, pressurizing to the pressure required by the experiment, inducing the generation of hydrate particles through ice particles (the temperature and the pressure required by the generation of the hydrate must reach phase equilibrium conditions, the ice particle induction method is a mature conventional technology and is not described here), and marking the moment as an initial moment $t_0$ of the experiment, wherein the hydrate particles are formed by the inhibitor solution;

3) hydrate particles annealing stage:

raising the temperature of the constant-temperature environment to the experimental temperature and keeping stable for 2 h, namely annealing for 2 h, so as to ensure that shells of the hydrate particles are hard enough;

4) adhesion force testing stage:

adjusting the three-dimensional moving platform 11 through the three-dimensional tilt-shift connecting rod 10 to enable two measuring objects to be kept on the same horizontal line, as shown in FIG. 2, where x1 moves up and down to be on the same horizontal line with x2, then controlling the three-dimensional moving platform 11 to enable the tip x1 of the glass fiber on the three-dimensional moving platform to slowly approach the tip x2 of the other glass fiber at a constant speed, namely enabling a moving end to gradually approach a fixed end, enabling the moving end to continuously move to press the fixed end and displace 0.3 mm after the two measuring objects are contacted, keeping the two measuring objects in contact for 10 s, and then slowly pulling apart at a constant speed until the two measuring objects are completely separated;

because the glass fiber itself is elastic, when x1 moves to contact with x2, x1 continues to move and presses the tip x2 to continue to move towards the original displacement direction of the x1;

the two measuring objects are hydrate particles generated by the ice particle induction method in the step 2) and hydrate particles (formed by ice particles)/carbon steel/liquid drops mentioned in the step 1), and the centers of the measuring objects are kept on the same horizontal line during testing;

photographing an image when two measuring objects are separated by using a microscopic imaging system, measuring the displacement of particles at the tip x2 of the separation time by using the ImageJ software and converting the displacement into the actual displacement of a fixed end, calculating a micro-mechanical force between the two objects by using Hooke's law, and repeating the experiment 40 times; wherein the smaller adhesion force between hydrate particles formed by an inhibitor solution to be tested and hydrate particles/liquid drops/carbon steel indicates more excellent performance of the inhibitor; and 5) slowly releasing pressure through the blow-off valve A V3 after the experiment is finished.

in the step 1), the process of measuring an elasticity coefficient of glass fibers is preferably as follows:

placing a support on an electronic balance, pressing a top end of the support by using the glass fibers, recording the displacement of a bottom end of the glass fibers and the reading of the balance, and calculating the elastic coefficient according to Hooke's law;

in the step 4), when the micro-mechanical force between the two objects is calculated by using Hooke's law, in order to eliminate the influence of the particle size on the measurement, the particle size needs to be normalized, and then a correction value of the micro-mechanical force between the two objects can be obtained. Specifically, the process of calculating a micro-mechanical force between the two measuring objects is as follows:

$$F = k \cdot \delta \qquad (1)$$

$$R^* = \frac{2R_1 R_2}{R_1 + R_2} \qquad (2)$$

$$F^* = \frac{F}{R^*} \qquad (3)$$

wherein F is a measurement value of the micro-mechanical force between two measuring objects, and the unit is N; F* is a correction value of the micro-mechanical force between two measuring objects, and the unit is N; k is the elastic coefficient of the glass fiber, and the unit is N/m; $\delta$ is the actual displacement of the fixed end, and the unit is m; $R_1$ and $R_2$ are curvature radii of two measuring objects, the unit is m; and R* is a harmonic mean radius, and the unit is m.

Embodiment 4

Figure 3:
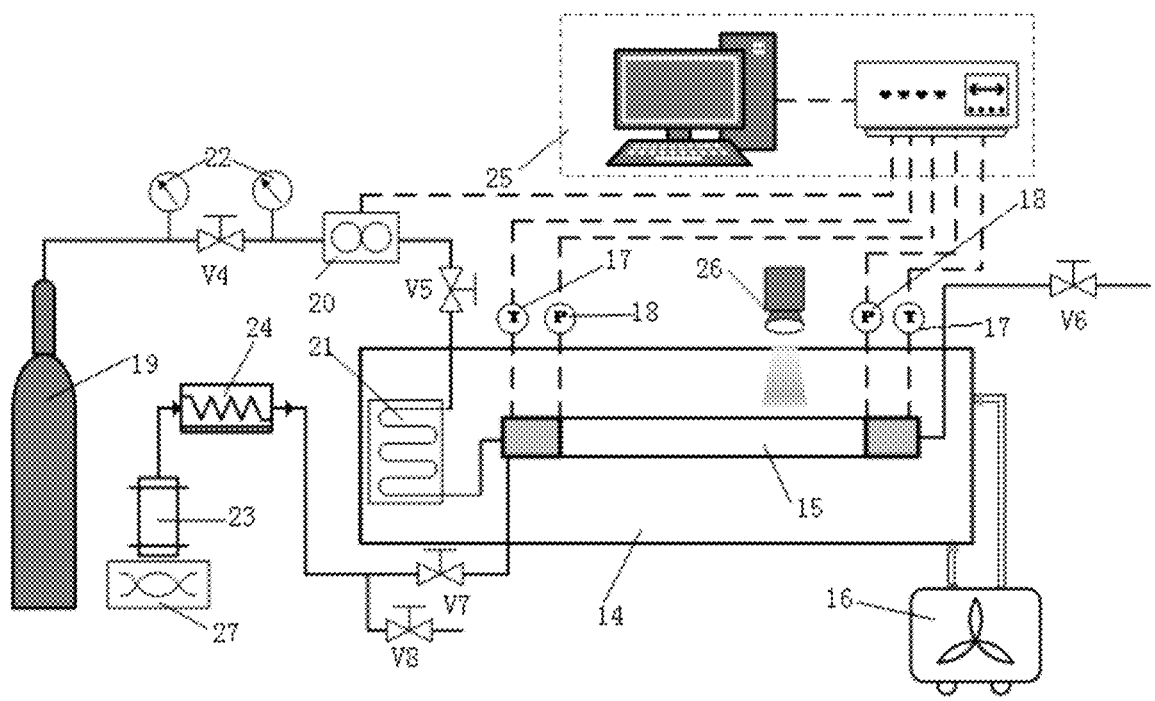
FIG. 3 is a schematic diagram of a structure of a macroscopic evaluation device according to the present invention.

A microscopic and macroscopic evaluation method for a dual-effect hydrate inhibitor, as described in Embodiment 1, the difference is that, as shown in FIG. 3, the macroscopic evaluation device includes an experiment module, a water injection module, a gas injection module B, and a data collection module B, wherein the experiment module includes a constant-temperature water bath 14 and a fully transparent PVC pipe 15 positioned in the constant-temperature water bath 14, the fully transparent PVC pipe 15 has an inner diameter of 12 mm, a total length of 1.0 m, and the pressure resistance of 10 MPa, the generation, deposition and blockage processes of hydrates all occur in the fully transparent PVC pipe 15, the constant-temperature water bath 14 is connected to a refrigeration cycle machine 16 through a pipeline and configured to keep a temperature of the constant-temperature water bath 14 constant, both ends of the fully transparent PVC pipe 15 are provided with temperature sensors B 17 and pressure sensors B 18, and the data collection module is configured to collect and monitor temperature and pressure changes in the experiment process in real time;

the gas injection module B includes a high-pressure gas source B 19, a pipeline of the high-pressure gas source B 19 is connected to an inlet of the fully transparent PVC pipe 15 through a pressure reducing valve B V4, a gas flowmeter 20, a gas inlet valve B V5 and a cooling pipe coil 21, a pressure gauge B 22 is arranged on the pipeline of the high-pressure gas source B 19, an outlet of the fully transparent PVC pipe 15 is also connected to a pipeline outlet valve V6, the pipeline outlet valve V6 is in communication with the atmosphere, and the experimental pressure is controlled by controlling the outlet valve; high-pressure gas enters from the pipeline inlet through the gas flowmeter 20 with a test solution, wherein the high-pressure gas needs to be cooled by a coil pipe placed in a cold water bath before entering an experimental pipeline so as to reach the experimental temperature;

the water injection module includes a container for containing a test solution 23, the test solution 23 enters from the inlet of the fully transparent PVC pipe 15 through a liquid plunger pump 24 and a water inlet valve V7, a blow-off valve B V8 is arranged on a pipeline of the test solution 23, the liquid plunger pump 24 can control the water injection rate by adjusting the pump frequency, the test solution is an inhibitor solution, which type of inhibitor needs to be tested, and the test solution with the required concentration, such as an ethylene glycol solution, needs to be prepared according to the test requirement;

the data collection module B includes a data collection system B 25 and a DV camera 26, the DV camera 26 is configured to photograph a blockage process in the fully transparent PVC pipe 15 in real time, namely the hydrate migration, deposition and blockage states, the gas flowmeter 20 and the temperature sensors B 17 and the pressure sensors B 18 at the two ends of the fully transparent PVC pipe are connected to the data collection system B 25, and the temperature sensors B 17 and the pressure sensors B 18 monitor the temperature and pressure changes of an inlet and an outlet in real time and transmit the temperature and pressure changes into the data collection system B together with the gas flowmeter.

A pipeline at the outlet of the full transparent PVC pipe 15 is bent and placed in a 100° C. thermal insulation barrel, and a pipeline at the outlet of the pipeline has a serious throttling effect due to the small pipe diameter, consequently, hydrate is easily generated at the outlet at a low temperature, and a non-experimental section is blocked. Therefore, the outlet of the pipeline is heated by using the thermal insulation barrel to prevent the outlet from being blocked.

Embodiment 5

A microscopic and macroscopic evaluation method for a dual-effect hydrate inhibitor, as described in Embodiment 4, the difference is that the experimental steps of the macroscopic evaluation device include:

S1: experimental preparation stage

Opening a pressure reducing valve V4, a gas inlet valve V5 and a pipeline outlet valve V6 sequentially, adding experimental gas into the fully transparent PVC pipe 15, discharging residual gas and liquid in the pipe to ensure that the gas in the pipe is pure, then closing all the valves, reducing the temperature of the constant-temperature water bath 14 to the experimental temperature by using the refrigeration cycle machine 16, reducing the temperature of the test solution to the experimental temperature, and mixing the test solution well by a magnetic stirrer 27;

S2, starting a data collection system B 25 to collect data, collecting temperature change of an inlet and an outlet by temperature sensors B 17, collecting pressure changes of the inlet and the outlet by pressure sensors B 18, collecting gas flow rate changes by a gas flowmeter 20, opening a pressure reducing valve B V4 and a gas inlet valve B V5 to enable experimental gas to enter an experimental pipeline, wherein the numerical value of a pressure gauge B 22 is the residual pressure of a gas source and the outlet pressure of the gas source, controlling the pipeline outlet valve V6 to change the pressure of the fully transparent PVC pipe, and keeping the opening of the pipeline outlet valve V6 stable when the pressure in the fully transparent PVC pipe reaches the experimental pressure;

S3: recording an initial amount $m_0$ of the test solution, starting the liquid plunger pump 24, keeping the closure of the water inlet valve V7, opening the blow-off valve B V8 to discharge the residual water and air in the pipeline, closing the blow-off valve B V8, opening the water inlet valve V7 and injecting the test solution 23 into the fully transparent PVC pipe 15 at a constant rate, and recording the time $t_0$ for starting injection as a starting moment of the experiment;

S4: collecting data in real time through the temperature sensors B 17, the pressure sensors B 18, and the gas flowmeter 20, and photographing the process of hydrate generation, deposition and blockage in the fully transparent PVC pipe in real time through the DV camera 26; and S5: in the experiment, keeping the pressure of the inlet of the pipeline stable by controlling the pressure reducing valve B V4, when the occurrence of hydrate blockage, and the pressure of the outlet of the pipeline and the gas flow are observed to be reduced to 0 (namely, when the values of the pressure sensors B at the outlet end of the fully transparent PVC pipe and the gas flowmeter are 0), which means that the experiment is finished, closing the liquid plunger pump 24, recording the amount of the residual test solution and the time t that is used as the termination time of the experiment, slowly opening the pipeline outlet valve V6 to reduce the pressure in the pipeline, promoting the hydrate decomposition, weighing the weight of hydrate decomposition water, and use the weight to reversely calculate the amount of deposited hydrate.

Embodiment 6

A microscopic and macroscopic evaluation method for a dual-effect hydrate inhibitor, as described in Embodiment 3, the difference is as follows:

(1) preparing hydrate inhibitors A and B to be evaluated and preparing inhibitor solutions at different concentrations, where A was a single inhibitor and B is a compound inhibitor, as shown in Table 1, placing the inhibitor solution droplets at the tips of the two glass fibers, preparing ice particles (taking the measurement of the adhesion force between hydrate particles as an example) by using liquid nitrogen, quickly placing the ice particles into a cavity, adding methane gas, pressurizing to an experimental pressure, and generating hydrate particles;

(2) heating the water bath temperature to the experimental temperature and annealing for 2 h, adjusting a three-dimensional tilt-shaft connecting rod to enable two hydrate particles to slowly approach at a constant speed and contact and displace for 0.3 mm, keeping the two particles in contact for 10 s and then slowly pulling apart, then calculating the micro-mechanical force between the two particles through Hooke's law, repeating the experiment 40 times, and representing the aggregation effect of the inhibitor on the particles according to the micro-mechanical force measurement result (in evaluating the effect of the inhibitor on inhibiting the adhesion of particles to the pipe wall, one of the particles can be replaced by carbon steel), as shown in Table 1:

TABLE 1

Performance evaluation result of dual-effect hydrate inhibitor in microscopic evaluation device

| Test solution | Experimental pressure MPa | Experimental temperature K | Particle displacement mm | Particle size mm | Adhesion force $mNm^{-1}$ | Evaluation results |
|---|---|---|---|---|---|---|
| Pure water | 4 | 275.15 | 0.8679 | 0.7 | 23.5 | ① |
| 0.1 wt % of A | 4 | 275.15 | 0.7534 | 0.73 | 20.4 | ② |
| 0.5 wt % of A | 4 | 275.15 | 0.5355 | 0.74 | 14.5 | ③ |
| 1 wt % of A | 4 | 275.15 | 0.2807 | 0.72 | 7.6 | ④ |
| 0.5 wt % of A + 10 wt % of B | 4 | 275.15 | 0.0997 | 0.75 | 2.7 | ⑤ |

Figure 4A:
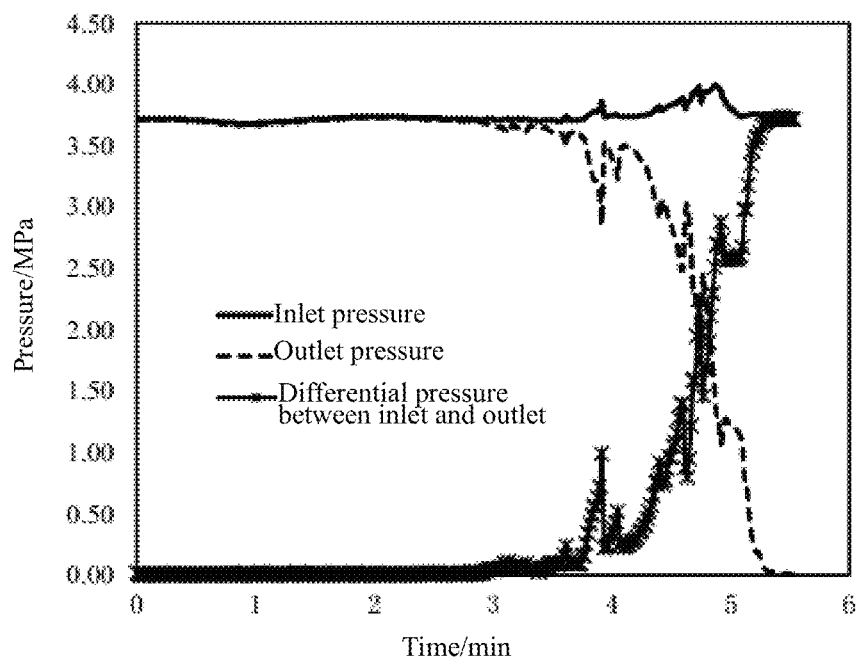
FIG. 4A is a curve showing a pressure change of an inlet and outlet of a flow pipeline.
Figure 4B:
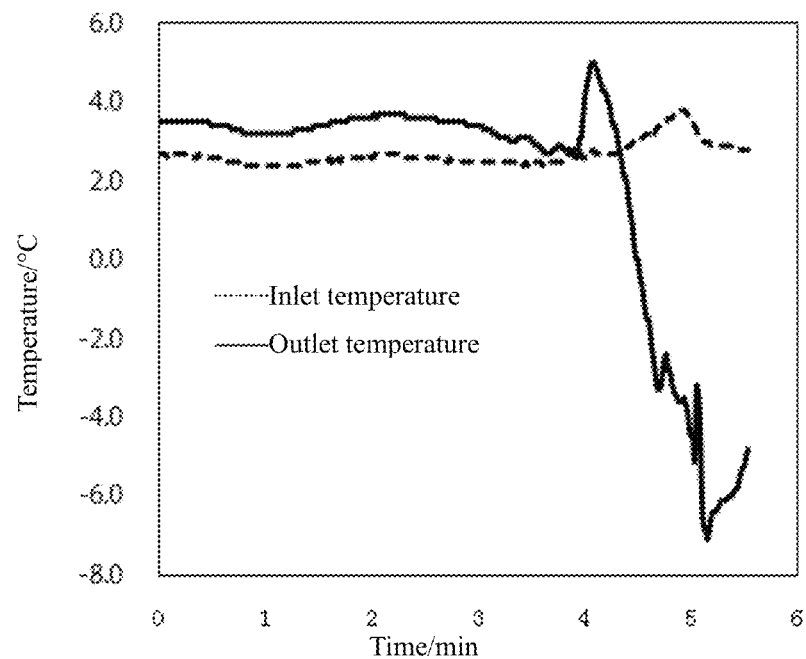
FIG. 4B is a curve showing a temperature change of an inlet and outlet of a flow pipeline.
Figure 5:
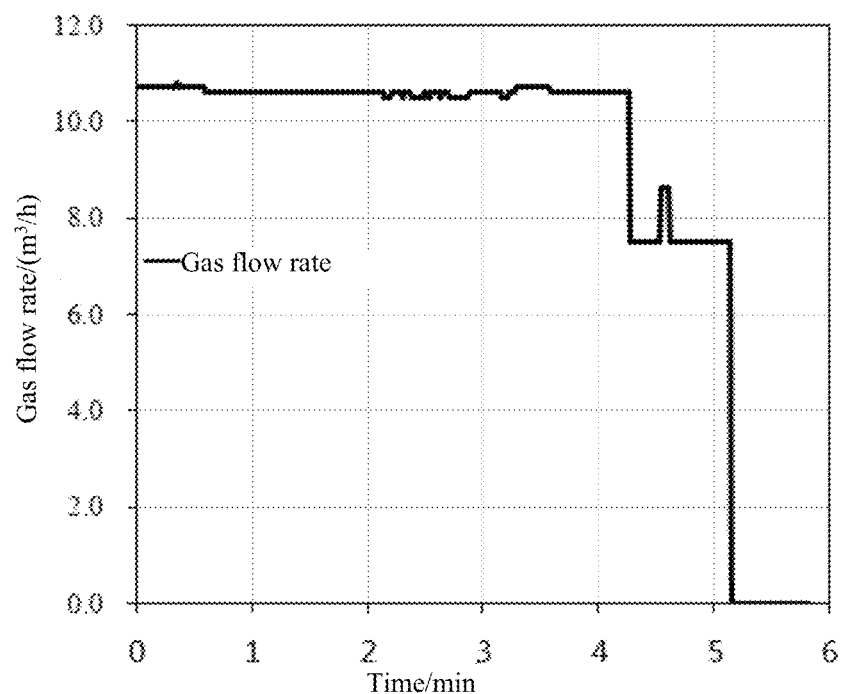
FIG. 5 is a curve showing a gas flow rate change of a flow pipeline.

(3) performing a hydrate deposition and blockage experiment in a flowing state by using the same hydrate inhibitor solution as in the step (1) through a macroscopic evaluation device, cooling the temperature of the pipeline to an experiment temperature through a constant-temperature water bath, adding methane gas into the pipeline, pressurizing the pipeline until the experiment pressure was stable, then adding the prepared and cooled inhibitor solution, and stirring the solution through a magnetic stirrer all the time in the injection process;

(4) collecting data in real time by using a temperature sensors B 17, a pressure sensors B 18 and a gas flowmeter 20, as shown in FIG. 4A, FIG. 4B and FIG. 5, where when the pressure and the flow at the outlet of a pipeline were reduced to 0 and the pipeline was significantly blocked, the experiment was finished, the pressure in the pipeline was slowly released, and the microscopic experiment result was verified and macroscopically evaluated according to the experimental blockage time, as shown in Table 2:

TABLE 2

Performance evaluation result of dual-effect hydrate inhibitor in flow pipeline

| Test solution | Experimental pressure (MPa) | Experimental temperature (K) | Gas flow | Water injection speed (g/s) | blockage time (min) | Evaluation results |
|---|---|---|---|---|---|---|
| Pure water | 4.0 | 274.85 | 7.5 | 0.25 | 8 | ① |
| 0.1 wt % of A | 4.03 | 275.15 | 7.5 | 0.25 | 10 | ② |
| 0.5 wt % of A | 3.98 | 275.35 | 7.5 | 0.25 | 16 | ③ |
| 1 wt % of A | 3.99 | 274.80 | 7.5 | 0.25 | 25 | ④ |
| 0.5 wt % of A + 10 wt % of B | 4.02 | 275.25 | 7.5 | 0.25 | Unblocked | ⑤ |

It can be seen from the test results shown in Tables 1 and 2 that the addition of the dual-effect hydrate inhibitor can effectively reduce the adhesion force among hydrate particles, so that the generated hydrate particles are difficult to agglomerate, certain fluidity is maintained, the hydrate can be discharged out of a pipe along with the flow of the pipe even if being generated, the formation of block hydrate aggregates and the adhesion and deposition of the pipe wall are avoided, and the time for blocking the pipe by the hydrate is deferred. Meanwhile, according to the test results, the higher the concentration of the hydrate inhibitor single agent A is, the better the performance is; and the performance of the compound inhibitor prepared by compounding single agents A and B is far better than that of single inhibitor.

The above descriptions are preferred examples of the present invention. It should be noted that those of ordinary skill in the art can also make several improvements and modifications without departing from the principle of the present invention, and such improvements and modifications shall fall within the protection scope of the present invention.

What is claimed is:

1. A microscopic and macroscopic evaluation method for a dual-effect hydrate inhibitor, comprising: comprehensively evaluating the dual-effect hydrate inhibitor microscopically and macroscopically through a microscopic evaluation device and a macroscopic evaluation device, and screening out the dual-effect hydrate inhibitor with excellent performance; wherein the microscopic evaluation device comprises a micro-mechanical force (MMF) measurement module, a constant-temperature water bath module, a first gas injection module, and a first data collection module, wherein the MMF measurement module comprises a high-pressure cavity, a three-dimensional tilt-shift connecting rod, and a three-dimensional moving platform, the three-dimensional moving platform is arranged in the high-pressure cavity and is connected to the three-dimensional tilt-shift connecting rod, and a position of the three-dimensional moving platform is adjusted through the three-dimensional tilt-shift connecting rod;

two glass fibers are arranged in the high-pressure cavity, a first end of a first glass fiber of the two glass fibers is fixed on an inner wall of the high-pressure cavity, a second end of the first glass fiber is configured to place ice particles, a first end of a second glass fiber of the two glass fibers is fixed on the three-dimensional moving platform, and a second end of the second glass fiber is configured to place the ice particles, liquid drops, or carbon steel;

the constant-temperature water bath module comprises a circulating water bath system, and the high-pressure cavity is arranged in a constant-temperature environment to reach a temperature required by an experiment;

the first gas injection module comprises a first high-pressure gas source, a pipeline of the first high-pressure gas source is connected to the high-pressure cavity through a first pressure reducing valve and a first gas inlet valve, a first pressure gauge is arranged on the pipeline of the first high-pressure gas source, and a first blow-off valve is arranged on the high-pressure cavity;

the first data collection module comprises a microscopic imaging system, a first data collection system, a first temperature sensor, and a first pressure sensor, wherein a visible window is installed on the high-pressure cavity, the microscopic imaging system is aligned with the visible window to observe a microscopic morphology in the high-pressure cavity in real time, the first temperature sensor and the first pressure sensor are connected to the high-pressure cavity and configured to measure a pressure and the temperature in real time, and the microscopic imaging system, the first temperature sensor, and the first pressure sensor are in a signal connection to the first data collection system;

experimental steps of the microscopic evaluation device comprise:

1) experiment preparation stage:

cooling the constant-temperature environment to −7 to −10° C. by using the circulating water bath system, measuring an elasticity coefficient of the two glass fibers required by the experiment, taking the two glass fibers, placing required test liquid drops at a tip of the first glass fiber, preparing the ice particles by liquid nitrogen, and placing the ice particles, the carbon steel, or the liquid drops at the tip of the second glass fiber as required;

2) hydrate particles induction stage:

rapidly putting the ice particles into the high-pressure cavity, opening the first blow-off valve, circulating and ventilating the high-pressure cavity through the first high-pressure gas source to ensure gas in the high-pressure cavity is pure, closing the first blow-off valve, pressurizing to the pressure required by the experiment, inducing a generation of hydrate particles through the ice particles, and marking a moment as an initial moment of the experiment;

3) hydrate particles annealing stage:

raising a temperature of the constant-temperature environment to the temperature required by the experiment and keeping stable for 2 h to ensure shells of the hydrate particles are hard;

4) adhesion force testing stage:

adjusting the three-dimensional moving platform through the three-dimensional tilt-shift connecting rod to enable two measuring objects to be kept on a same horizontal line, then controlling the three-dimensional moving platform to enable the tip of the second glass fiber on the three-dimensional moving platform to slowly approach a tip of the first glass fiber at a constant speed, namely enabling a moving end to gradually approach a fixed end, enabling the moving end to continuously move to press the fixed end and displacing 0.3 mm after the two measuring objects are contacted, keeping the two measuring objects in contact for 10 s, and then slowly pulling apart at the constant speed until the two measuring objects are completely separated;

photographing an image when the two measuring objects are separated by using the microscopic imaging system to obtain a photographed image, measuring a displacement of the fixed end in the photographed image, and converting the displacement into an actual displacement of the fixed end;

calculating a micro-mechanical force between the two measuring objects by using Hooke's law, and repeating the experiment 40 times;

5) slowly releasing the pressure through the first blow-off valve after the experiment is finished;

in the step 1), a process of measuring the elasticity coefficient of the two glass fibers is as follows:

placing a support on an electronic balance, pressing a top end of the support by using the two glass fibers, recording a displacement of a bottom end of the two glass fibers and a reading of the electronic balance, and calculating the elastic coefficient according to the Hooke's law;

in the step 4), after the displacement of the fixed end in the photographed image is measured, the displacement on the photographed image is converted into the actual displacement by using a calibration paper, or the actual displacement is obtained by using an ImageJ software for a processing;

in the step 4), a process of calculating the micro-mechanical force between the two measuring objects is as follows:

$$F = k \cdot \delta \quad (1)$$

$$R^* = \frac{2R_1 R_2}{R_1 + R_2} \quad (2)$$

$$F^* = \frac{F}{R^*} \quad (3)$$

wherein F is a measurement value of the micro-mechanical force between the two measuring objects, and a unit of the F is N; F* is a correction value of the micro-mechanical force between the two measuring objects, and a unit of the F* is N; k is the elastic coefficient of the two glass fibers, and a unit of the k is N/m; δ is the actual displacement of the fixed end, and a unit of the δ is m; $R_1$ and $R_2$ are curvature radiis of the two measuring objects, and a unit of the $R_1$ and the $R_2$ is m; and R* is a harmonic mean radius, and a unit of the R* is m;

the macroscopic evaluation device comprises an experiment module, a water injection module, a second gas injection module, and a second data collection module, wherein the experiment module comprises a constant-temperature water bath and a fully transparent PVC pipe positioned in the constant-temperature water bath, the constant-temperature water bath is connected to a refrigeration cycle machine through the pipeline and configured to keep a temperature of the constant-temperature water bath constant, and two ends of the fully transparent PVC pipe are provided with a second temperature sensor and a second pressure sensor;

the second gas injection module comprises a second high-pressure gas source, a pipeline of the second high-pressure gas source is connected to an inlet of the fully transparent PVC pipe through a second pressure reducing valve, a gas flowmeter, a second gas inlet valve, and a cooling pipe coil, a second pressure gauge is arranged on the pipeline of the second high-pressure gas source, and an outlet of the fully transparent PVC pipe is connected to a pipeline outlet valve;

the water injection module comprises a container for containing a test solution, the test solution enters from the inlet of the fully transparent PVC pipe through a liquid plunger pump and a water inlet valve, and a second blow-off valve is arranged on a pipeline of the test solution;

the second data collection module comprises a second data collection system and a DV camera, the DV camera is configured to photograph a blockage process in the fully transparent PVC pipe in real time, and the gas flowmeter and the second temperature sensor and the second pressure sensor at the two ends of the fully transparent PVC pipe are connected to the second data collection system;

a pipeline at the outlet of the full transparent PVC pipe is bent and placed in a 100° C. thermal insulation barrel;

experimental steps of the macroscopic evaluation device comprise:

S1: experimental preparation stage:

adding an experimental gas into the fully transparent PVC pipe, discharging residual gas and liquids in the fully transparent PVC pipe to ensure the experimental gas in the fully transparent PVC pipe is pure, reducing the temperature of the constant-temperature water bath to the temperature required by the experiment, reducing a temperature of the test solution to the temperature required by the experiment, and mixing the test solution by a magnetic stirrer;

S2: starting the second data collection system to collect data, opening the second gas inlet valve to enable the experimental gas to enter an experimental pipeline, controlling the pipeline outlet valve to change a pressure of the fully transparent PVC pipe, and keeping an opening of the pipeline outlet valve stable when the pressure in the fully transparent PVC pipe reaches an experimental pressure;

S3: recording an initial amount of the test solution, starting the liquid plunger pump, injecting the test solution into the fully transparent PVC pipe at a constant rate, and recording a time for starting an injection as a starting moment of the experiment;

S4: collecting data in real time through the second temperature sensor, the second pressure sensor, and the gas flowmeter, and photographing a process of a hydrate generation, a hydrate deposition and a hydrate blockage in the fully transparent PVC pipe in real time through the DV camera;

S5: in the experiment, keeping a pressure of an inlet of the experimental pipeline stable by controlling the second pressure reducing valve, when an occurrence of the hydrate blockage, and a pressure of an outlet of the experimental pipeline and a gas flow are observed to be reduced to 0, the experiment is finished, closing the liquid plunger pump, recording an amount of a residual test solution and a time used as a termination time of the experiment, slowly opening the pipeline outlet valve to reduce the pressure in the experimental pipeline, promoting a hydrate decomposition, weighing a weight of a hydrate decomposition water, and using the weight to reversely calculate an amount of a deposited hydrate; and the experimental steps of the macroscopic evaluation device is embodied in three aspects of an experimental pipeline blockage time, differential pressures between the inlet of the experimental pipeline and the outlet of the experimental pipeline, and a temperature drop amplitude caused by a throttling effect after the experimental pipeline is completely blocked; by comparing a time period required from a beginning of the experiment to a complete blockage of the experimental pipeline and a time period required for the differential pressures between the inlet of the experimental pipeline and the outlet of the experimental pipeline to reach a maximum, effects of the dual-effect hydrate inhibitor on "preventing a aggregation of the hydrate particles" and "inhibiting an adhesion of the hydrate particles on a pipe wall" are compared, and a longer time period indicates a better effect of the dual-effect hydrate inhibitor; or the effects of the dual-effect hydrate inhibitor are compared by comparing a magnitude of a temperature drop at the outlet when the experimental pipeline is completely blocked, a smaller temperature drop amplitude represents a more loose formed hydrate aggregate and indicates a better inhibition effect.

2. The microscopic and macroscopic evaluation method for the dual-effect hydrate inhibitor according to claim 1, wherein the first high-pressure gas source is a hydrocarbon gas.

* * * * *